US012786317B2

(12) United States Patent
Bhattacharjee

(10) Patent No.: US 12,786,317 B2
(45) Date of Patent: Nov. 3, 2026

(54) MOBILE DEVICE CORRELATION BETWEEN DIFFERENT SERVICE PROVIDER SYSTEM SERVICES

(71) Applicant: Charter Communications Operating, LLC, St. Louis, MO (US)

(72) Inventor: Kaushik Bhattacharjee, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 277 days.

(21) Appl. No.: 18/777,744

(22) Filed: Jul. 19, 2024

(65) Prior Publication Data

US 2026/0025467 A1 Jan. 22, 2026

(51) Int. Cl.
*H04W 8/18* (2009.01)
*H04M 15/00* (2006.01)

(52) U.S. Cl.
CPC ......... *H04M 15/725* (2013.01); *H04M 15/58* (2013.01); *H04W 8/18* (2013.01)

(58) Field of Classification Search
CPC ...... H04M 15/58; H04M 15/725; H04W 8/18
See application file for complete search history.

(56) References Cited

U.S. PATENT DOCUMENTS

2007/0167173 A1* 7/2007 Halcrow ................. H04W 4/02 455/456.2
2023/0179998 A1* 6/2023 McCracken, Jr. .... H04L 63/083 726/6

* cited by examiner

*Primary Examiner* — Jeanette J Parker
*Assistant Examiner* — Dung L Law
(74) *Attorney, Agent, or Firm* — Young Basile Hanlon & MacFarlane, P.C.

(57) ABSTRACT

Methods and systems for correlating a mobile device with respect to wireless communications services provided by a service provider. A method includes triggering a correlation engine when a mobile device connected to an access device has mobile services capability, comparing access device and mobile services based customer identifiers, comparing access device and mobility services based characteristics when the customer identifiers match, marking in a fidelity matrix that the mobile device is a potential service provider provided mobile device if the mobile device foregoes use of mobile services for data usage when the characteristics match and an average connection time with the access device exceeds or meets a threshold, and verifying that the mobile device is a service provider provided mobile device when a fidelity score level in the fidelity matrix meets or exceeds a defined fidelity threshold, wherein the fidelity score level is based on data usage patterns.

20 Claims, 10 Drawing Sheets

7710

Fidelity Matrix/ Heuristic cycle
Numbers are just a sample used as a reference

| | Fidelity Score Level | Mobile Device identifier in the WiFi realm | 1st seen in the WiFi network | mobile data connection Time (in Hour)/day & Usage | WiFi data connection Time (in Hour)/day & Usage | Heuristic Cycle (10 days Post purchase of a mobile device/service) |
|---|---|---|---|---|---|---|
| | 1 | <Mobile1> | Timestamp - (Existed before the purchase) (is new after the mobile device is activated) | Unknown - if the device uses different mobile network<br>Known - if the device is a MVNO device | <1 | Device is available in WiFi network <1 hour |
| Potential MVNO device | 2 | <Mobile2> | Timestamp (is new after the mobile device is activated) | Known - if the device is a MVNO device | >1- <3 | Device is available in WiFi network between 1-3 hours per day<br>2. During that connectivity period<br>WiFi data usage > 100 MB<br>Mobile Data usage = <100 MB<br>3 |
| MVNO device | 3 | <Mobile3> | Timestamp (is new after the mobile device is activated) | Known - if the device is a MVNO device | >3 | Device is available in WiFi network > 3 hours per day<br>During that connectivity period<br>WiFi data usage > 100 MB<br>Mobile Data usage = <10 MB |

FIG. 7A

MOBILE DEVICE CORRELATION BETWEEN DIFFERENT SERVICE PROVIDER SYSTEM SERVICES

TECHNICAL FIELD

This disclosure relates to wireless communications services. More specifically, this disclosure relates to correlation and management of mobile devices with respect to wireless communications services provided by a service provider.

BACKGROUND

Service providers have traditionally provided service provider networks to support communication services such as, but not limited to, Internet, local wireless communication services, WiFi services, high speed data services, and combinations thereof (collectively "local services"). These service providers are now starting to provide cellular or mobile wireless communication services (collectively "mobile services") in the form of a Mobile Virtual Network Operator (MVNO). An MVNO is a company that does not own a mobile spectrum license but sells mobile services under its brand name using the network of a licensed mobile operator or mobile network operator (MNO). A mobile device operating on an MVNO network uses mobile services, such as data and voice, via a mobile or mobile data network from the licensed mobile operator. The MVNO pays fees to the licensed mobile operator when the mobile device uses the mobile services. Therefore, a MVNO provider tries to use the service provider network instead of the MVNO network and/or mobile or MNO network whenever possible to decrease costs and increase profitability.

When the mobile device connects to a customer's or subscriber's local wireless or WiFi network (can be referred to as service provider network herein) via an access point (which is owned by the service provider), the service provider tries to switch from the mobile or MNO network to the customer's local wireless network or access point to avoid the MNO cost. However, switching the mobile device to the service provider network is not easily done. The identifier of a mobile device when using a mobile network is its physical Media Access Controller (MAC) address, Integrated Circuit Card Identifier (ICCID), International Mobile Equipment Identity (IMEI), Mobile Device Number (aka Subscriber Identity/Identification Module (SIM)), and/or combinations thereof (collectively "mobile device identifier"). The identifier of the mobile device when using local wireless network is the local wireless network, access point, or WiFi MAC address (collectively "access point or device identifier"). That is, the mobile device does not use or emit any of the mobile device identifiers. Therefore, it is a complex problem for service providers to consistently identify the mobile devices that use the service provider's MVNO network and switch the mobile traffic from the mobile device to the local wireless network and/or service provider network.

SUMMARY

Disclosed herein is a system and method for correlation and management of mobile devices with respect to wireless communications services provided by a service provider. In implementations, a method includes triggering a device correlation engine when a mobile device connected to an access device has mobile services capability, comparing, by the device correlation engine for the mobile device, an access device based customer identifier with a mobile services based customer identifier, comparing, by the device correlation engine for the mobile device, access device based characteristics with mobile services based characteristics on an occurrence of a match between the access device based customer identifier and the mobile services based customer, marking in a fidelity matrix that the mobile device is a potential service provider provided mobile device if the mobile device foregoes use of mobile services for data usage on an occurrence of a match between the access device based characteristics and the mobile services based characteristics and when an average connection time with the access device exceeds or meets a threshold, and verifying that the mobile device is a service provider provided mobile device when a fidelity score level in the fidelity matrix meets or exceeds a defined fidelity threshold, wherein the fidelity score level is based on data usage patterns for the mobility device when connected to the access device.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 7A is a diagram of an example of a fidelity matrix in accordance with embodiments of this disclosure.

DETAILED DESCRIPTION

Figure 1:
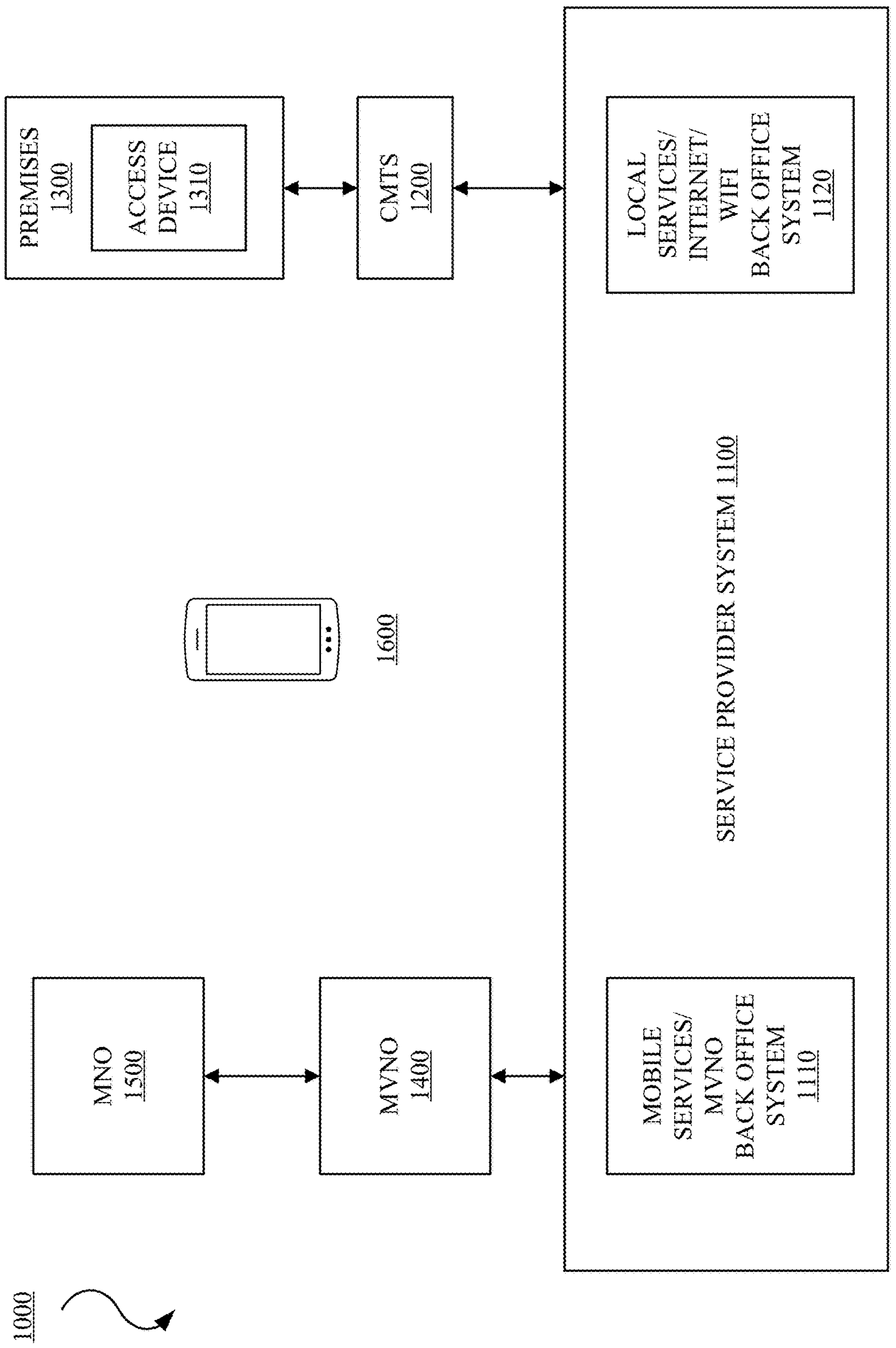
FIG. 1 is a diagram of an example of a wireless communications architecture in accordance with embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology “server”, “computer”, “computing device or platform”, or “cloud computing system” includes any unit, or combination of units, capable of performing any method, or any portion or portions thereof, disclosed herein. For example, the “server”, “computer”, “computing device or platform”, or “cloud computing system” may include at least one or more processor(s).

As used herein, the terminology “processor” or “processing circuitry” indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the term “engine” may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology “memory” indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term “memory” includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology “instructions” may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term “application” refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology “determine” and “identify,” or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology “example,” “the embodiment,” “implementation,” “aspect,” “feature,” or “element” indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology “or” is intended to mean an inclusive “or” rather than an exclusive “or.” That is, unless specified otherwise, or clear from context, “X includes A or B” is intended to indicate any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from the context to be directed to a singular form.

As used herein, unless explicitly stated otherwise, any term specified in the singular may include its plural version. For example, “a computer that stores data and runs software,” may include a single computer that stores data and runs software or two computers-a first computer that stores data and a second computer that runs software. Also “a computer that stores data and runs software,” may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for correlation and management of mobile devices with respect to wireless communications services provided by a service provider. A service provider can provide local services via access points and mobile services via a MVNO network in connection with a MNO network. In the latter instance, the service provider pays fees when a mobile device uses the MNO network. In implementations, systems and methods described herein can identify and/or correlate a service provider provided mobile device with a service provider providing local services when the mobile device is connected to an access point provided by the service provider, thus enabling efficient and consistent traffic switching or data offloading from the mobile network, and provisioning of enhanced services, such as but not limited to, increased upload and download speeds, discounts, enhanced data packages, and/or combinations thereof.

In implementations, a customer can have local services with a service provider. The customer can then acquire a mobile device from the service provider. The service provider's mobile services back office can maintain a customer account with relevant information such as a customer identifier or identification, number of lines, and mobile device characteristics including mobile device identifier. The service provider's mobile services back office can notify a service provider's local services back office of the mobile device activation. The service provider's local services back office can correlate and validate the customer's local services account with the mobile services account using, for example, the customer identifier. The local services back office can trigger a machine learning process to watch for all new mobile device connection notifications to a customer's access point.

In implementations, the systems and methods described herein can use the machine learning engine or machine learning techniques to validate or confirm that the mobile device is in fact a service provider provided and/or MVNO mobile device of the customer by checking for connectivity and mobile network data usage patterns. In implementations, the machine learning engine can determine if the mobile device has a consistent connection pattern against the access device of the customer, e.g., whether the mobile device gets connected to the access point each day in a specific period. If so, the machine learning process can mark or tag the mobile device as a potential service provider provided or MVNO mobile device. A fidelity matrix can be maintained by the machine learning engine based on the learned connectivity and mobile network data usage patterns. If a fidelity matrix identification score meets or exceeds a defined threshold, then the mobile device can be marked as a service provider provided mobile device for the customer. In implementations, the fidelity matrix identification score can be based on, but not limited to, mobile network connection time, local wireless connection time, and presence on local wireless network, where one or more of the elements are evaluated over a defined period of time. In implementations, a confirmation message can be sent to the subscriber or customer of the mobile device to confirm and assign a device name that can be used for efficient future connections to the access point. The mobile device can be marked as a privileged mobile device upon receipt of a confirmation. Moreover, the privileged mobile device can be eligible for additional service features as described herein.

FIG. 1 is a diagram of an example of a wireless communications architecture 1000 in accordance with embodiments of this disclosure. The wireless communications architecture 1000 can include, but is not limited to, a service provider system 1100, a cable modem termination system (CMTS) 1200, a premises 1300, a MVNO 1400, a MNO 1500, and mobile device(s) 1600. The service provider system 1100, the cable modem termination system (CMTS) 1200, the premises 1300, the MVNO 1400, the MNO, and the mobile device(s) 1600 can be connected to or be in communication with (collectively "connected to") with each other as described herein. The number of components shown herein are illustrative and there may be more or less in the wireless communications architecture 1000. The wireless communications architecture 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The service provider system 1100 can include, but is not limited to, a mobile services and/or MVNO back office system 1110 (collectively "mobile services back office system 1110") connected to the MVNO 1400 and the MNO 1500 to provide mobile services and connectivity, and a local services, Internet, high speed, and/or WiFi back office system 1120 (collectively "local services back office system 1120") connected to the MVNO 1400 and the MNO 1500 to provide local services and connectivity. The service provider system 1100 is owned, operated, and controlled by a service provider.

The CMTS 1200 provides high speed data services, Internet, or Voice over Internet Protocol, to service provider subscribers and/or customers at the premises 1300 via the access device 1310. The service provider system 1100 is owned, operated, and controlled by the service provider.

The premises 1300 can be, but is not limited to, offices and/or residences.

The access device 1310 can be, but is not limited to, integrated modems, modems, gateways, routers, access points, and/or other devices that can provide the local services at the premises 1300. The service provider system 1100 is operated and controlled by the service provider. The service provider system 1100 can own the access device 1310.

The MVNO 1400 can be a system which provides the mobile services under the name of the service provider using the network of a licensed mobile operator such as the MNO 1500. The MVNO 1400 is owned, operated, and controlled by the service provider. The MVNO 1400 pays fees to the MNO 1500 to use the network of the MNO 1500, The MNO 1500 can be a licensed mobile operator that provides mobile services to mobile device subscribers. The MNO 1500 is owned, operated, and controlled by the MNO.

The mobile device(s) 1600 can include, but is not limited to, mobile device(s), smartphone(s), and/or other devices which can provide and/or support access to the mobile services via the MVNO 1400 and the MNO 1500, and which can provide and/or support access to the local services via the CMTS 1200 and the access device 1310. In implementations, the mobile device(s) 1600 can be provided by the MVNO 1400 and/or the service provider.

Figure 2:
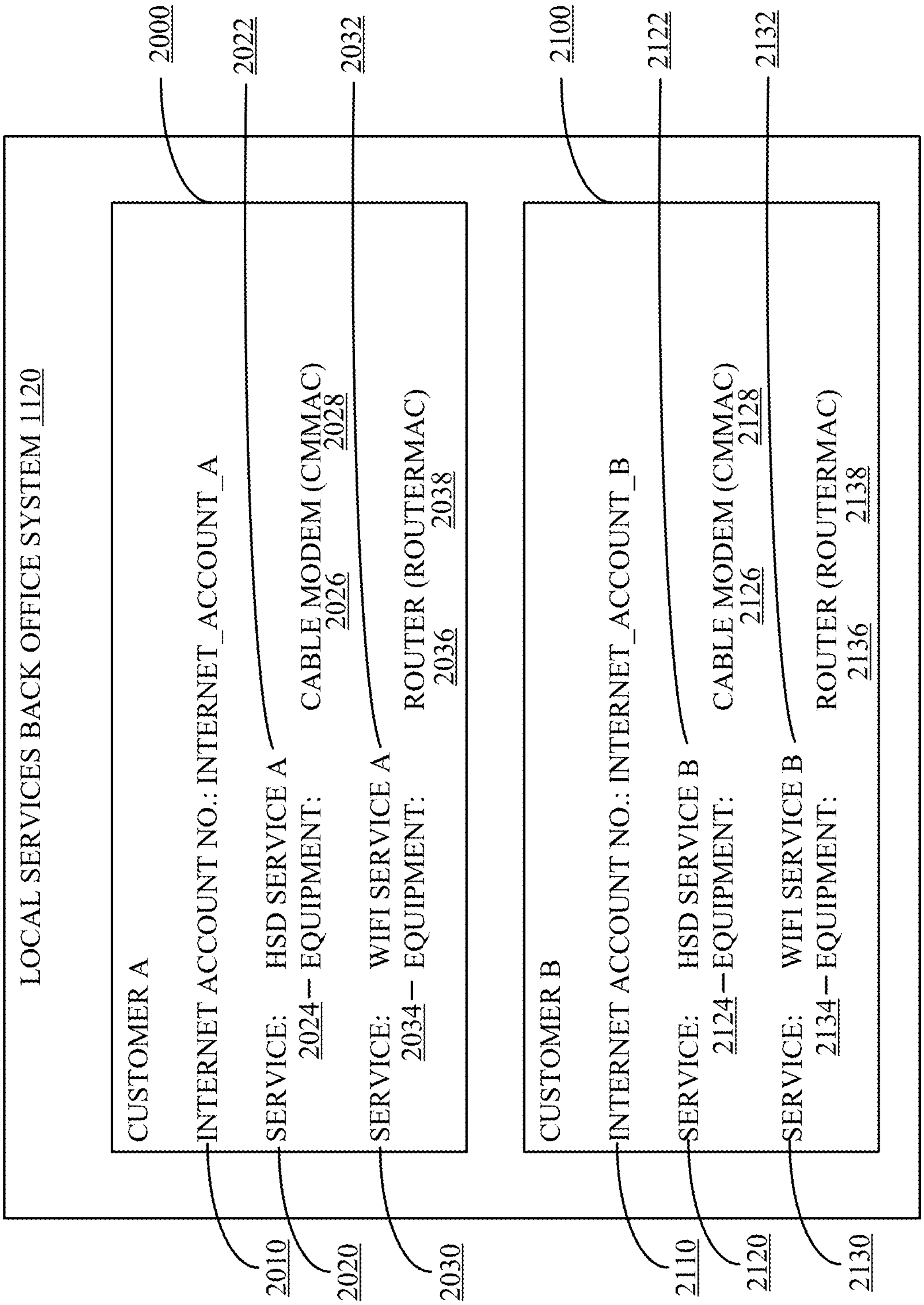
FIG. 2 is a diagram of information and/or data at a local services back office in accordance with embodiments of this disclosure.

The local services back office system 1120 can provide, manage, authenticate, and/or otherwise enable the providing of the local services to the customer at the premises 1300 via mobile device(s) when connected to the access device 1310. The local services back office system 1120 can maintain customer information in a table or other format as shown in FIG. 2, which is a diagram of customer information and/or data 2000 and 2100 for a customer A and B, respectively, at the local services back office 1120 in accordance with embodiments of this disclosure. In implementations, the customer information and/or data 2000 for the customer A can include, but is not limited to, an Internet account number 2010, a service 2020, and a service 2030. The service 2020 can include, but is not limited to, a service type 2022 and an equipment type 2024 with a device name 2026 and an identifier 2028, and the service 2030 can include, but is not limited to, a service type 2032 and an equipment type 2034 with a device name 2036 and an identifier 2038. In implementations, the service type 2022 is a HSD service, the device name 2026 is a cable modem, and the identifier 2028 is CMMAC. In implementations, the service type 2032 is a WiFi service, the device name 2036 is a router, and the identifier 2038 is ROUTERMAC. In implementations, the customer information and/or data 2100 for the customer B can include, but is not limited to, an Internet account number 2110, a service 2120, and a service 2130. The service 2120 can include, but is not limited to, a service type 2122 and an equipment type 2124 with a device name 2126 and an identifier 2128, and the service 2130 can include, but is not limited to, a service type 2132 and an equipment type 2134 with a device name 2136 and an identifier 2138. In implementations, the service type 2122 is a HSD service, the device name 2126 is a cable modem, and the identifier 2128 is CMMAC. In implementations, the service type 2132 is a WiFi service, the device name 2136 is a router, and the identifier 2138 is ROUTERMAC.

Figure 3:
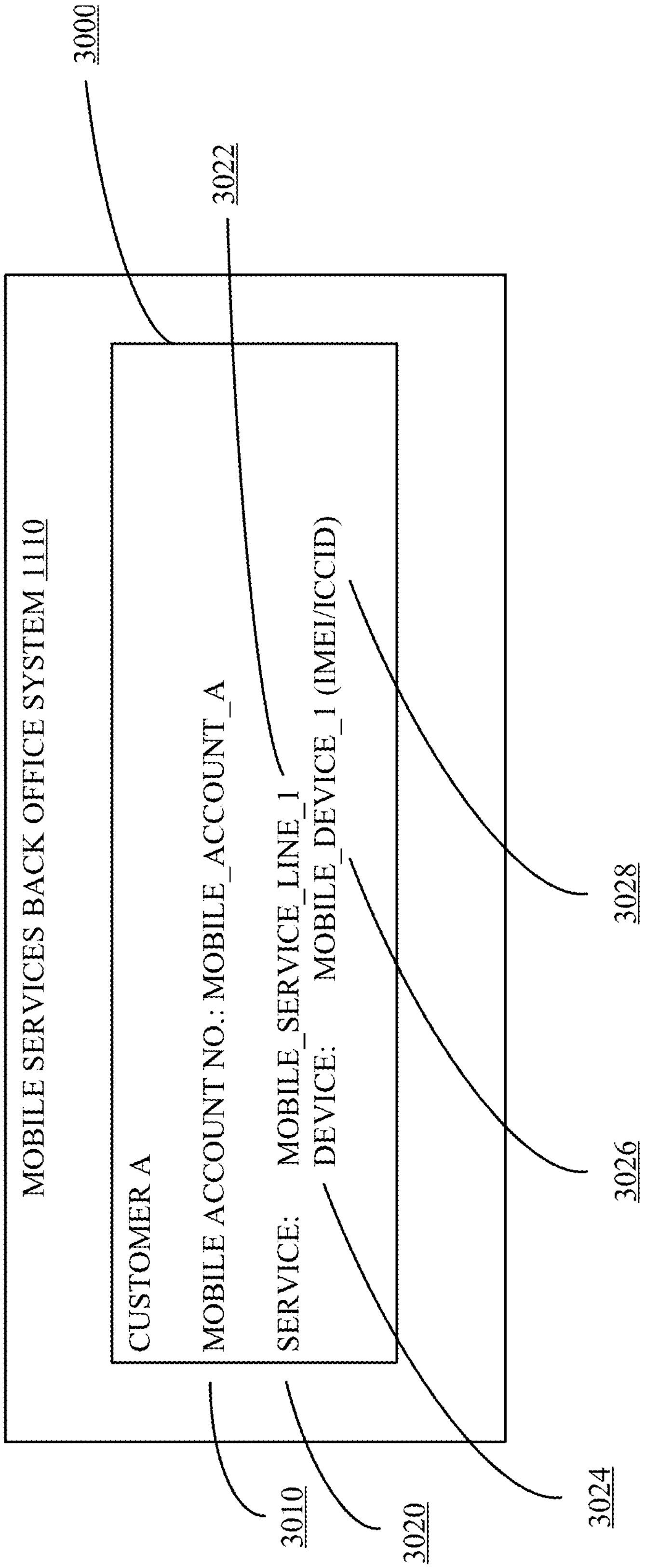
FIG. 3 is a diagram of information and/or data at a MVNO services back office in accordance with embodiments of this disclosure.

In an illustrative example, the customer A can buy the mobile device 1600 and mobile services from the service provider operating as the MVNO 1400. The mobile services back office system 1110 can provide, manage, authenticate, and/or otherwise enable the providing of the mobile services to the customer A via the mobile device 1600 when connected to the networks of the MNO 1500 via the MVNO 1400. The mobile services back office system 1110 can maintain customer information in a table or other format as shown in FIG. 3, which is a diagram of customer information and/or data 3000 for the customer A at the mobile services back office system 1110 in accordance with embodiments of this disclosure. In implementations, the customer information and/or data 3000 for the customer A can include, but is not limited to, a mobile services account number 3010 and a service 3020. The service 3020 can include, but is not limited to, a service type 3022 and an equipment or device type 3024 with a device name 3026 and an identifier 3028. In implementations, the service type 3022 is a mobile service for line 1, and the device name 3026 is a mobile device 1, and the identifier 3028 is IMEI/ICCID. In implementations, the mobile services back office system 1110 can maintain a secondary table or extension table which can include characteristics of the mobile device 1, i.e., the mobile device 1600. The characteristics of the mobile device 1, i.e., the mobile device 1600, can include but is not limited to, device type such as phone, tablet, watch, etc., device make such as iPhone, Android, Samsung, Google Pixel etc., and device model such as iPhone 15, 14, 13, XR, etc., Samsung Notes, etc.

Figure 4:
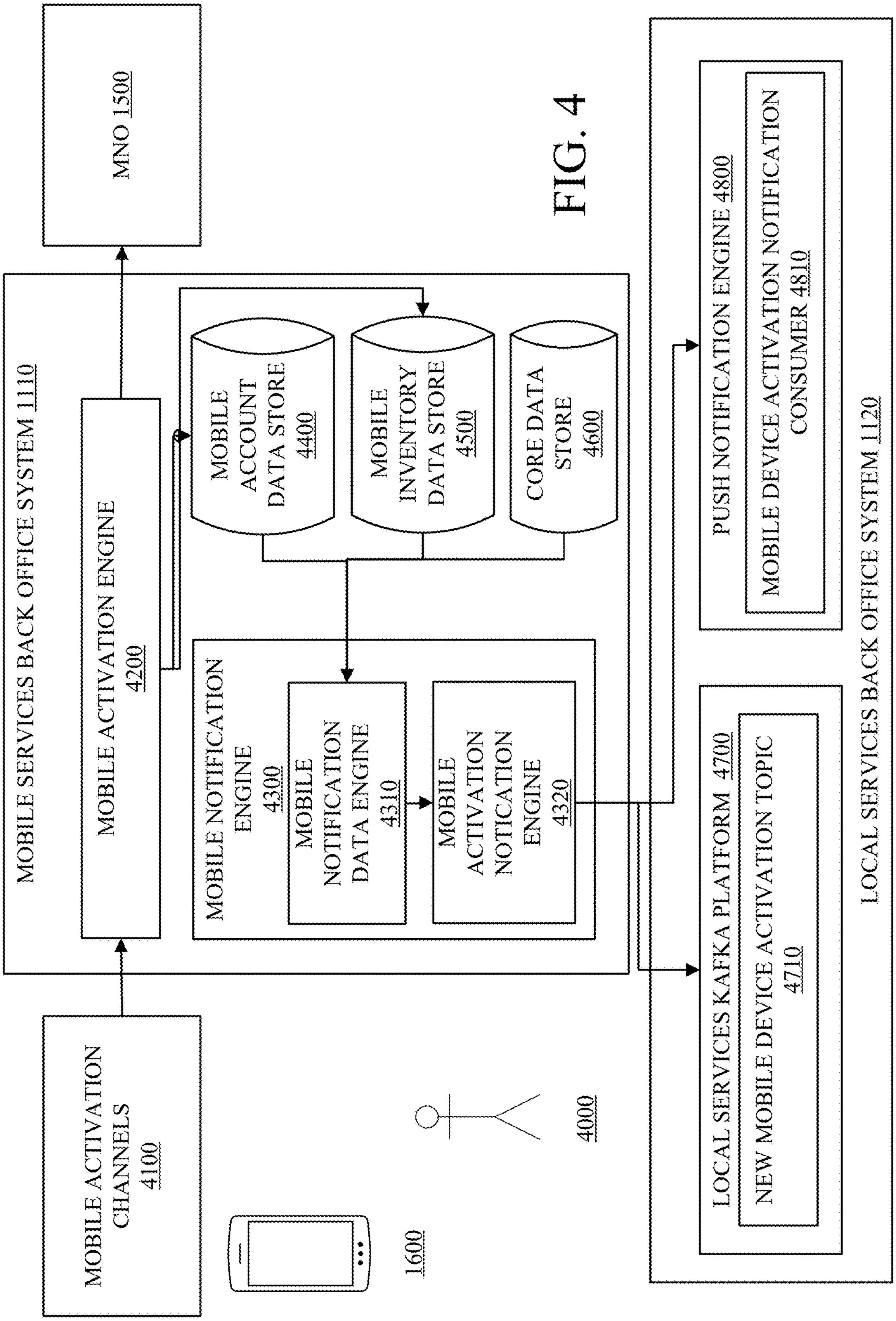
FIG. 4 is a diagram of an example of a mobile device activation in a MVNO network in the wireless communications architecture in accordance with embodiments of this disclosure.

Reference is now also made to FIG. 4, which is a diagram of an example of a mobile device activation in the network of the MVNO 1400 and MNO 1500 in the wireless communications architecture 1000 in accordance with embodiments of this disclosure. A customer or consumer 4000 can initiate activation of the mobile device 1600 via a mobile device activation channel 4100, e.g., online, at a service provider store, and/or combinations thereof. The mobile device activation channel 4100 can communicate with the mobile services back office system 1110 with respect to the activation of the mobile device 1600. The mobile services back office system 1110 can notify the MNO 1500 of the activation of the mobile services and the mobile device 1600.

With regard to mobile device activation, the mobile services back office system 1110 can include, but is not limited to, a mobile activation engine 4200, a mobile notification engine 4300, a mobile account data store 4400, a mobile inventory data store 4500, and a core data store 4600. The mobile notification engine 4300 can include, but is not limited to, a mobile notification data engine 4310 and a mobile activation notification engine 4320. The mobile account data store 4400 can store customer account information such as, but not limited to, customer identifier, mobile account number, mobile service lines, and mobile device from the mobile activation engine 4200. This is, for example, the information shown in FIG. 3. The mobile inventory data store 4500 can store mobile device characteristics such as, but not limited to, make, model, color, memory storage, and other mobile device information from the mobile activation engine 4200. The core data store 4600 can store, but is not limited to, mobile account number, mobile service line, core account number, core account line, and core service state. The mobile activation engine 4200, the mobile notification engine 4300, the mobile account data store 4400, the mobile notification data engine 4310, and the mobile activation notification engine 4320 can be one or more engines. The mobile account data store 4400, the mobile inventory data store 4500, and the core data store 4600 can be one or more data stores.

The mobile notification engine 4300 can gather or obtain data from the mobile account data store 4400, the mobile inventory data store 4500, and the core data store 4600 to generate a data package with respect to the new mobile device and mobile services activation. The mobile activation notification engine 4320 can generate an activation notification including the data package. The mobile activation notification engine 4320 can publish the activation notification to a new mobile device activation topic 4710 on a local services kafka platform 4700 in the local services back office system 1120 and to a push notification engine 4800. A mobile device activation notification consumer 4810 can push a notification to the consumer 4000.

Figure 5:
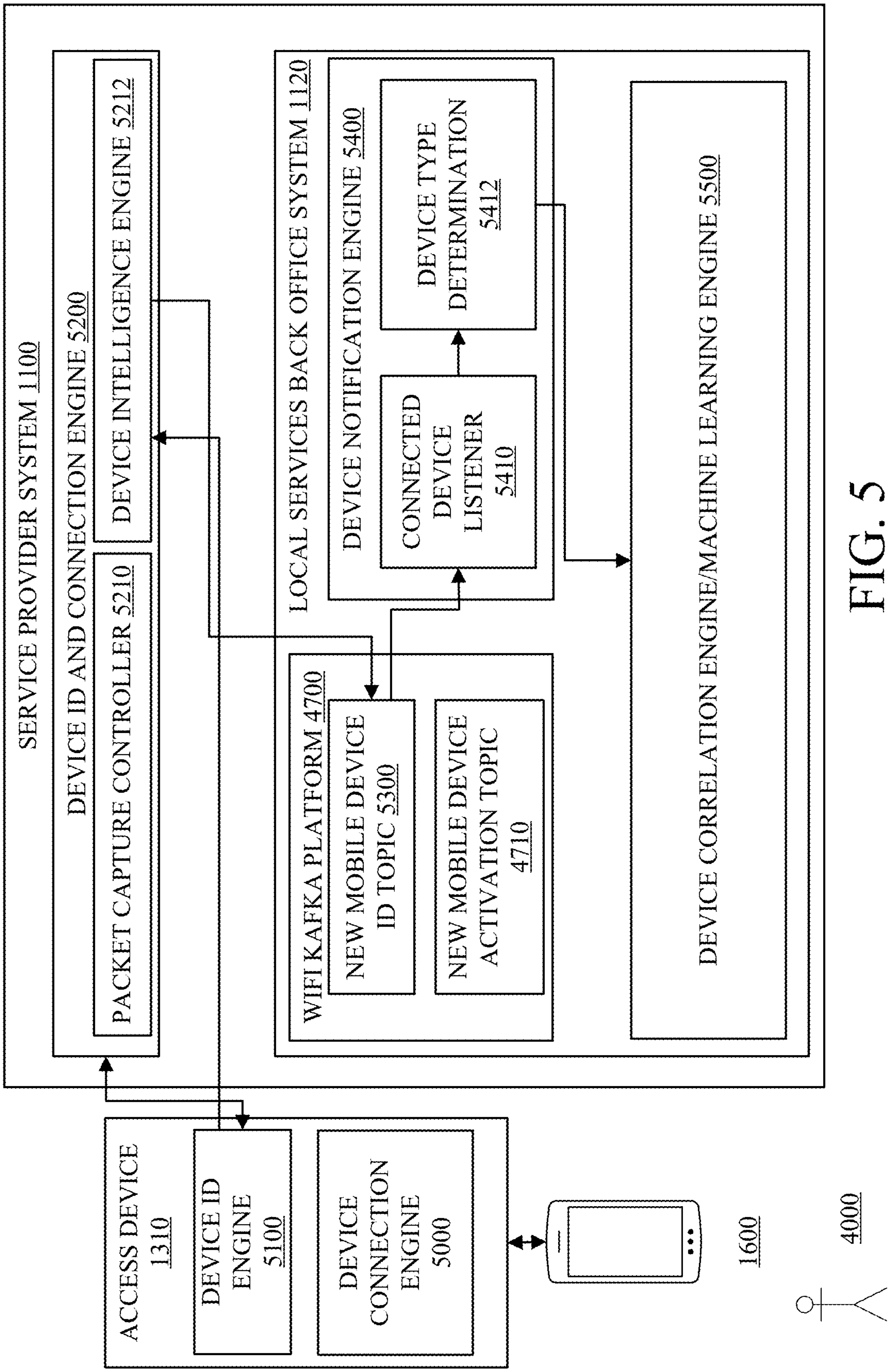
FIG. 5 is a diagram of an example of the mobile device connection to a local network in the wireless communications architecture in accordance with embodiments of this disclosure.

Reference is now also made to FIG. 5, which is a diagram of an example of the mobile device 1600 connecting to the access device 1310 in the wireless communications architecture 1000 in accordance with embodiments of this disclosure. The access device 1310 can include, but is not limited to, a device connection engine 5000 and a device identification engine 5100. The service provider system 1100 can include, but is not limited to, a device identification and connection engine 5200 and the local services back office system 1120. The local services back office system 1120 can include, but is not limited to, the local services kafka platform 4700, a device notification engine 5400, and a device correlation and/or machine learning engine 5500. The local services kafka platform 4700 can include, but is not limited to, the new mobile device activation topic 4710 and a new mobile device identification topic 5300. The device notification engine 5400 can include, but is not limited to, a connected device listener 5410 and a device type determination engine 5412.

The consumer 4000 can connect the mobile device 1600 with the access device 1310 via the device connection engine 5000 using known techniques and processes. The device identification engine 5100 and the device intelligence engine 5212 can capture packets (from traffic) from the mobile device 1600 at the control of the packet capture controller 5210. The device intelligence engine 5212 can determine a mobile device type, mobile device firmware, mobile device firmware version, and/or other information about the mobile device 1600 from the captured packets. The device intelligence engine 5212 can generate a data package which includes an identifier for the access device 1310, the mobile device type, the mobile device firmware, the mobile device firmware version, and/or other information about the mobile device 1600. The device intelligence engine 5212 can publish the data package on the new mobile device identification topic 5300 in the local services kafka platform 4700.

The connected device listener 5410 can listen for new publications on the new mobile device identification topic 5300 in the local services kafka platform 4700. For a new publication, the device type determination engine 5412 can determine if the data package represents a mobile device with mobile services capability. The device type determination engine 5412 can trigger the device correlation and/or machine learning engine 5500 to correlate and validate and/or confirm whether the mobile device 1600 is a service provider provided mobile device that is associated with the customer of the access device 1310 if the data package does represent a mobile device which has mobile services capability.

Figure 6:
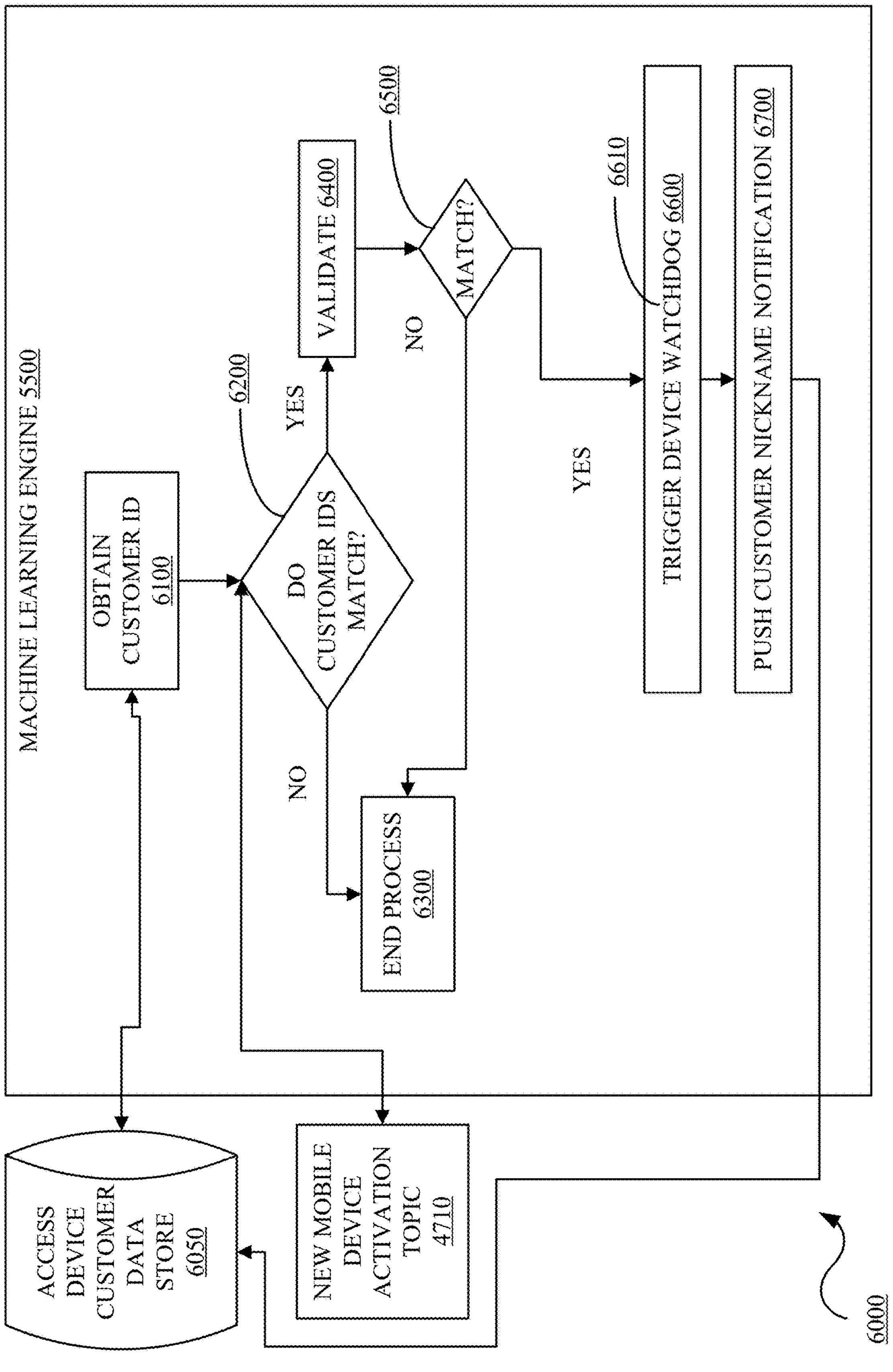
FIG. 6 is a diagram of an example of a machine learning engine to correlate identification of the mobile device between the local network and MNVO network in accordance with embodiments of this disclosure.

Reference is now also made to FIG. 6, which is a flowchart of an example method 6000 implemented by the device correlation and/or machine learning engine 5500 to correlate identification of the mobile device 1600 as between the local services and the mobile services in accordance with embodiments of this disclosure. At 6100, if triggered, the device correlation and/or machine learning engine 5500 can obtain a customer identifier based on the identifier of the access device 1310 from an access device customer data store 6050 in the service provider system 1100. At 6200, the device correlation and/or machine learning engine 5500 can determine if the customer identifier obtained from the access device customer data store 6050 for the connected mobile device 1600 matches a customer identifier present in the new mobile device activation topic 4710. This is a first level correlation and/or validation. At 6300, the method 6000 stops if the two customer identifiers do not match. That is, the mobile device 1600 is not a service provider provided mobile device.

At 6400, the device correlation and/or machine learning engine 5500 can validate the characteristics of the connected mobile device 1600 (i.e., as obtained by the local services back office system 1110 when the mobile device 1600 connected to the access device 1310) with the characteristics present in the new mobile device activation topic 4710 from the mobile services back office system 1110. At 6500, the device correlation and/or machine learning engine 5500 can determine if the two sets of characteristics match. At 6300, the method 6000 stops if the two sets of characteristics do not match. At 6600, the device correlation and/or machine learning engine 5500 can trigger a device watchdog application and/or system 6610. This a second level of correlation and/or validation.

Figure 7:
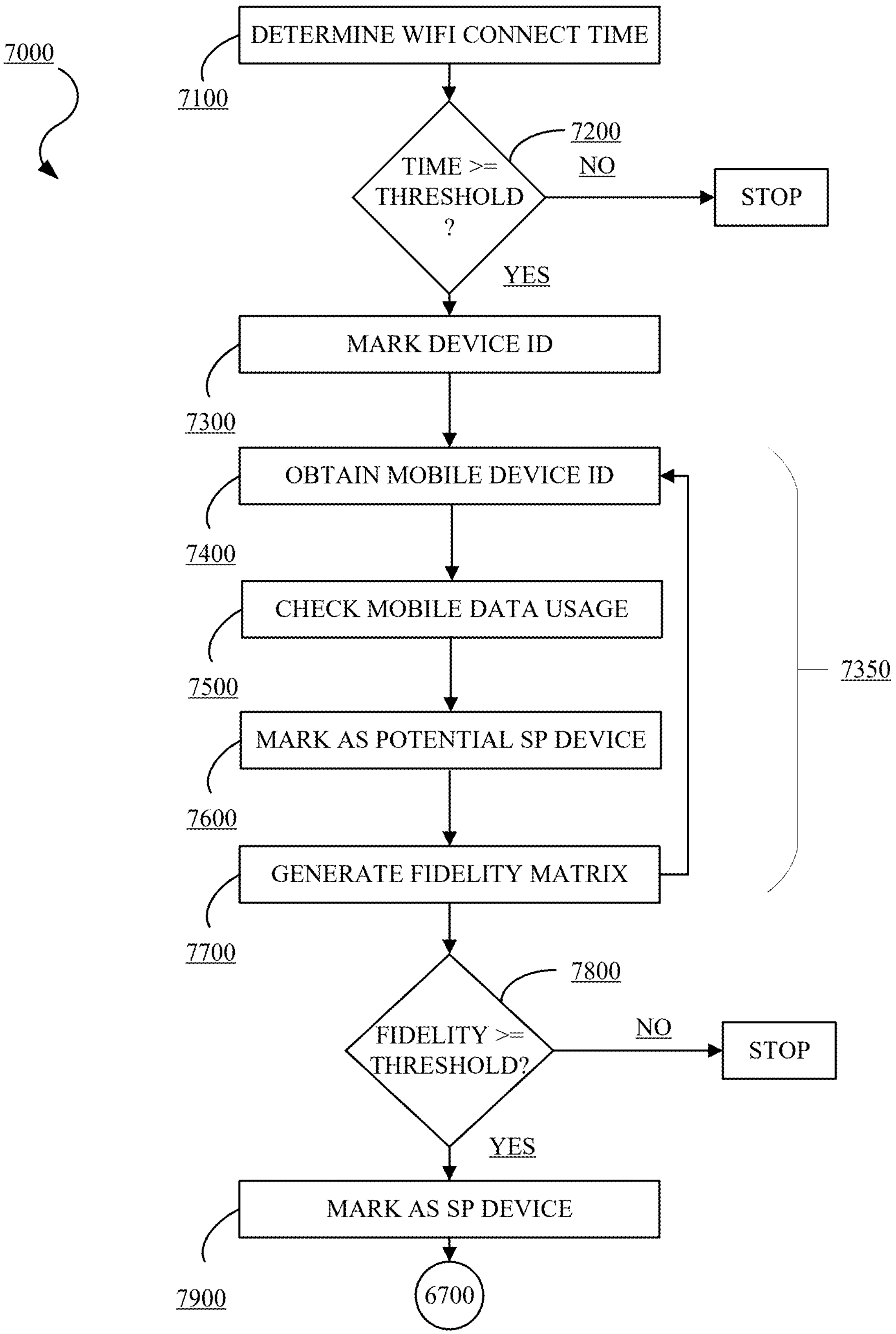
FIG. 7 is a flowchart of an example method for use by the machine learning engine to correlate identification of the mobile device between the local network and MNVO network in accordance with embodiments of this disclosure.

Reference is now also made to FIG. 7, which is a flowchart of an example method 7000 implemented by the device watchdog application and/or system 6610 in the device correlation and/or machine learning engine 5500 to correlate identification of the mobile device 1600 as between the local services and the mobile services in accordance with embodiments of this disclosure. At 7100, the device watchdog application and/or system 6610 can determine the average connection time that the connected mobile device 1600 is connected to the access device 1310 or associated local wireless network each day over a defined period of time. In implementations, the defined period of time can be 1 week or 7 days. At 7200, the device watchdog application and/or system 6610 can determine if the average connection time per day for the defined period of time meets or exceeds a defined connection time threshold. If the defined connection time threshold is not exceeded, then the method 7000 stops. If the defined connection time threshold is met or exceeded, at 7300, the device watchdog application and/or system 6610 can mark and place the connected mobile device 1600 or associated mobile device identifier under a data scanning procedure 7350. In an illustrative non-limiting example, the connected mobile device 1600 is connected to the access device 1310 for 525 minutes over a 7 period for an average connection time of 75 minutes. If the defined connection time threshold is 60 minutes, then the device watchdog application and/or system 6610 can proceed to the next step.

During the data scanning procedure 7350, at 7400, the device watchdog application and/or system 6610 can obtain the mobile device identifier for the mobile device 1600, e.g., the IMEI or the ICCID so that the device watchdog application and/or system 6610 can initiate data scanning. At 7500, each time the mobile device 1600 is connected to the access device 1310 and has data usage, the data scanning procedure 7350 can determine if the mobile device 1600 is using mobile services for data usage. At 7600, the mobile device 1600 is marked as a potential service provider device if mobile services are not being used as described herein with respect to FIG. 7A.

The data scanning procedure 7350 is the learning process for the device watchdog application and/or system 6610 and/or the device correlation and/or machine learning engine 5500. At 7700, the device watchdog application and/or system 6610 and/or the device correlation and/or machine learning engine 5500 can use the collected data to find or establish patterns and generate a fidelity matrix. Reference is now also made to FIG. 7A, which is a diagram of an example of a fidelity matrix 7710 in accordance with embodiments of this disclosure. In implementations, the fidelity matrix 7710 can include a defined number of fidelity score levels, where each fidelity score level reflects a status of the mobile device. In implementations, a final fidelity score level can be a defined fidelity threshold. Each fidelity score level can be based on, but not limited to, mobile network connection time, local wireless connection time, mobile network data usage, local wireless data usage, and/or presence on local wireless network, where one or more of the elements are evaluated over a defined period of time. In implementations, each fidelity score level can use defined thresholds for the mobile network connection time, local wireless connection time, mobile network data usage, and/or local wireless data usage to determine whether a mobile device can proceed to a next fidelity score level. At 7800, the device watchdog application and/or system 6610 and/or the device correlation and/or machine learning engine 5500 can determine if a fidelity score level and/or a fidelity identification score of the mobile device 1600 meets or exceeds a defined fidelity threshold. In implementations, the defined fidelity threshold is 3. In implementations, the defined fidelity threshold is 90%. In implementations, the defined fidelity threshold is 95%. In implementations, the defined fidelity threshold is configurable. If the fidelity score level and/or fidelity identification score does not meet or exceed the defined fidelity threshold, the process stops. At 7900, the mobile device 1600 is marked as a service provider provided device if the fidelity score level and/or fidelity identification score meets or exceeds the defined fidelity threshold.

At 6700, the device correlation and/or machine learning engine 5500 can push a notification to the customer of the mobile device 1600 to confirm and provide a name for the mobile device 1600. The device correlation and/or machine learning engine 5500 can save the provided name in the access device customer data store for future connections by the mobile device 1600.

Figure 8:
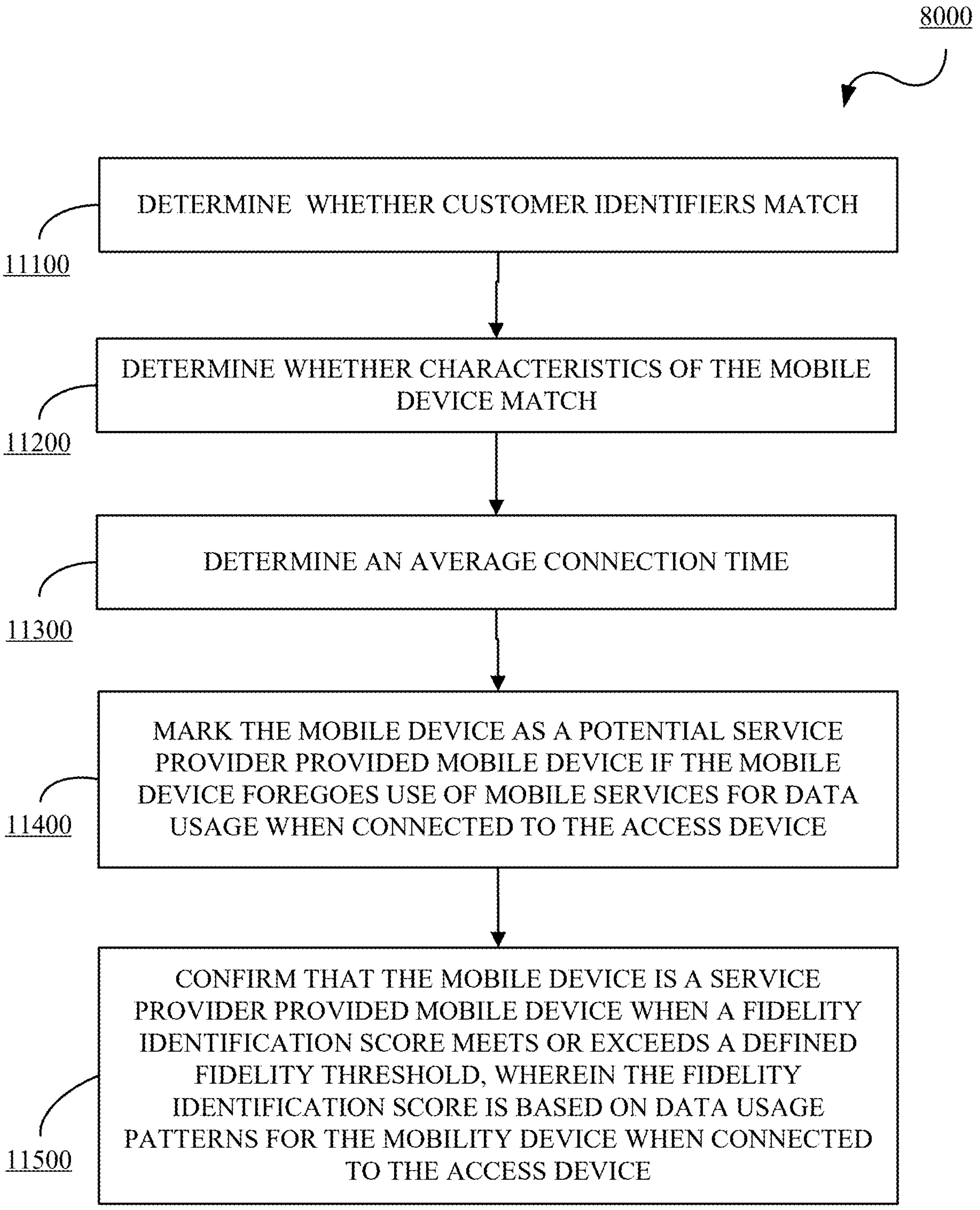
FIG. 8 is a flowchart of an example method for mobile device identification correlation between different service provider systems in accordance with embodiments of this disclosure.

FIG. 8 is a flowchart of an example method 8000 for mobile device correlation and validation as between local services and local services network and mobile services and mobile services network in accordance with embodiments of this disclosure.

The method 8000 includes: determining 8100 whether a customer identifier associated with an access device to which a mobile device is connected matches a customer identifier for the mobile device obtained from a mobile services back office system of a service provider, wherein the access device provides local services and is a service provider device; determining 8200 whether characteristics of the mobile device obtained by a local services back office system of the service provider when the mobile device connected to the access device matches characteristics of the mobile device maintained by the mobile services back office system of the service provider when the customer identifier associated with the access device matches the customer identifier for the mobile device obtained from the mobile services back office system; determining 8300 an average connection time for the mobile device with the access device across a defined period of time when the characteristics of the mobile device obtained by the local services back office system of the service provider matches the characteristics of the mobile device maintained by the mobile services back office system; marking 8400 the mobile device as a potential service provider provided mobile device if the mobile device foregoes use of mobile services for data usage when connected to the access device; and confirming 8500 that the mobile device is a service provider provided mobile device when a fidelity score level and/or fidelity identification score meets or exceeds a defined fidelity threshold, wherein the fidelity score level and/or fidelity identification score is based on connection time and/or data usage patterns for the mobility device when connected to the access device. The method 8000 can be implemented, for example, in or by components described with respect to FIGS. 1-5 and 9 in conjunction with any of the flows described with respect to FIGS. 6 and 7, as appropriate and applicable.

The method 8000 includes determining 8100 whether a customer identifier associated with an access device to which a mobile device is connected matches a customer identifier for the mobile device obtained from a mobile services back office system of a service provider, wherein the access device provides local services and is a service provider device. A local services back office system of the service provider maintains customer information and access device information for a customer as described herein. When the customer obtains and activates a mobile device which was obtained from the service provider, a mobile services back office system maintains customer information and mobile device information as described herein. When the mobile device is connected to the access device, the local services back office system can compare customer identifiers from local services back office system and the mobile services back office system for a match.

The method 8000 includes determining 8200 whether characteristics of the mobile device obtained by a local services back office system of the service provider when the mobile device connected to the access device matches characteristics of the mobile device maintained by the mobile services back office system of the service provider when the customer identifier associated with the access device matches the customer identifier for the mobile device obtained from the mobile services back office system. Each of the local services back office system and the mobile services back office system maintain some characteristics of the mobile device. These sets of characteristics are compared for consistency and validation.

The method 8000 includes determining 8300 an average connection time for the mobile device with the access device across a defined period of time when the characteristics of the mobile device obtained by the local services back office system of the service provider matches the characteristics of the mobile device maintained by the mobile services back office system. The local services back office system correlates mobile devices which appear on the access device on a regular basis. In these cases, a watchdog application is started to track data usage.

The method 8000 includes marking 8400 the mobile device as a potential service provider provided mobile device if the mobile device foregoes use of mobile services for data usage when connected to the access device. If the mobile device is a service provider provided device, then it should be using the access device for data usage and not the mobile services and associated network.

The method 8000 includes confirming 8500 that the mobile device is a service provider provided mobile device when a fidelity score level and/or fidelity identification score meets or exceeds a defined fidelity threshold, wherein the fidelity score level and/or fidelity identification score is based on connection time and/or data usage patterns for the mobility device when connected to the access device.

Figure 9:
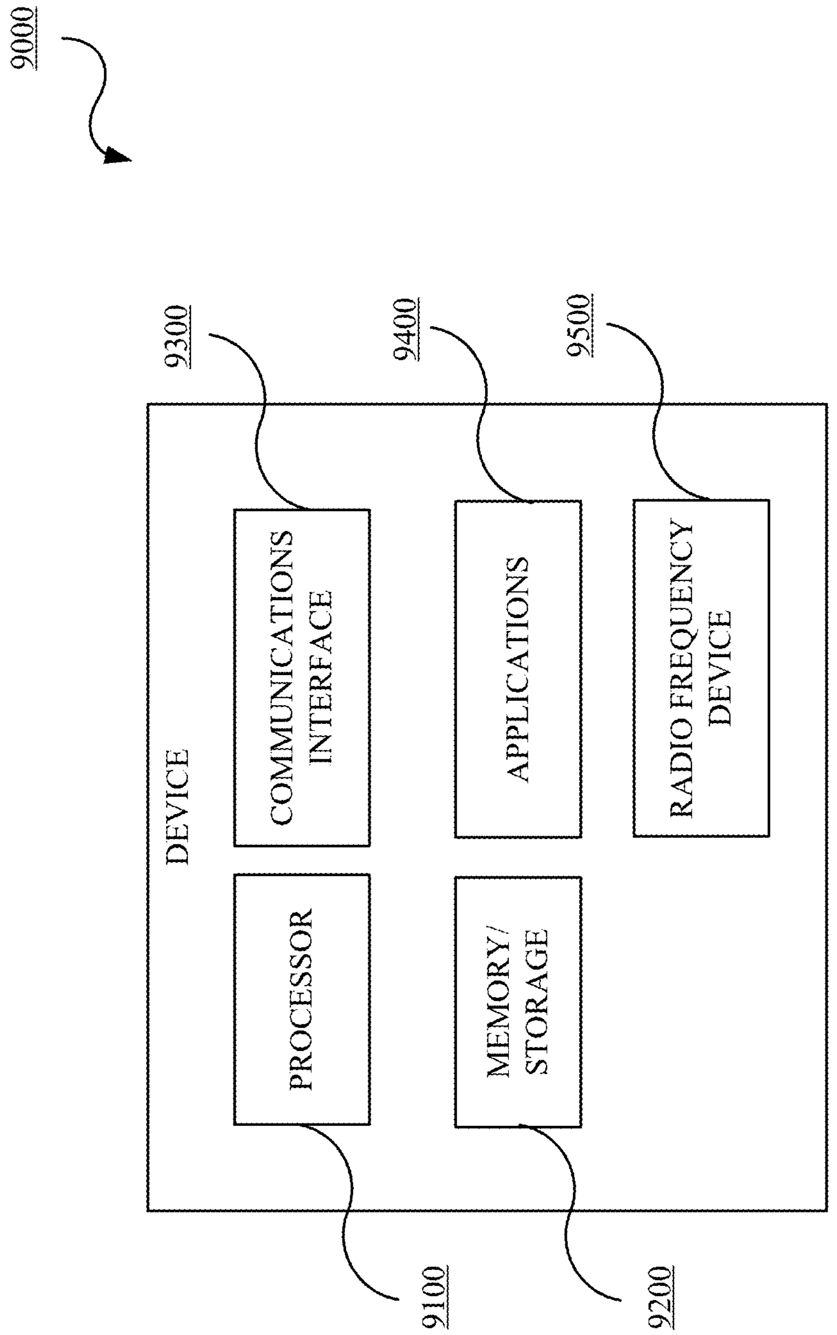
FIG. 9 is a block diagram of an example of a device in accordance with embodiments of this disclosure.

FIG. 9 is a block diagram of an example of a device 9000 in accordance with embodiments of this disclosure. The device 9000 may include, but is not limited to, a processor 9100, a memory/storage 9200, a communication interface 9300, applications 9400, and, if needed, a radio frequency device 9500. The device 9000 may include or implement, for example, the components described with respect to FIGS. 1-8. The applicable or appropriate flows, techniques, or methods described herein may be stored in the memory/storage 9200 and executed by the processor 9100 in cooperation with the memory/storage 9200, the communications interface 9300, the applications 9400, and the radio frequency device 9500 (when applicable), as appropriate. The device 9000 may include other elements which may be desirable or necessary to implement the devices, systems, and methods described herein. However, because such elements and steps do not facilitate a better understanding of the disclosed embodiments, a discussion of such elements and steps may not be provided herein.

Disclosed herein is a method for correlation and management of mobile devices with respect to wireless communications services provided by a service provider. In implementations, the method includes determining, by a device correlation engine in a service provider system, whether a customer identifier associated with an access device to which a mobile device is connected matches a customer identifier for the mobile device obtained from a mobile services back office system of a service provider, where the access device provides local services and is a service provider device, determining, by the device correlation engine, whether characteristics of the mobile device obtained by a local services back office system of the service provider matches characteristics of the mobile device maintained by the mobile services back office system when the customer identifier associated with the access device matches the customer identifier for the mobile device obtained from the mobile services back office system, determining, by the device correlation engine, an average connection time for the mobile device with the access device across a defined period of time when the characteristics of the mobile device obtained by the local services back office system matches the characteristics of the mobile device maintained by the mobile services back office system, marking, by the device correlation engine, the mobile device as a potential service provider provided mobile device in a fidelity matrix if the mobile device foregoes use of mobile services for data usage when the average connection meets or exceeds a defined threshold, and confirming, by the device correlation engine, that the mobile device is a service provider provided mobile device when a fidelity score level in the fidelity matrix meets or exceeds a defined fidelity threshold, wherein the fidelity score level is based on data usage patterns for the mobility device when connected to the access device.

In implementations, the method further includes triggering, by the local services back office system the device correlation engine, when the mobile device is a mobile device with mobile services capability. In implementations, the method further includes determining, by the local services back office system, whether the mobile device is a mobile device with mobile services capability. In implementations, the method further includes receiving, by the local services back office system from the access device, mobile device information to determine the mobile services capability. In implementations, the customer identifier associated with the access device is determined and maintained by the local services back office system. In implementations, the method further includes determining, by the local services back office system, the customer identifier in the local services back office system based on an access device identifier received from the access device. In implementations, the method further includes receiving, by the local services back office system from the access device, the characteristics of the mobile device as maintained by the local services back office system.

Disclosed herein is a system for correlation and management of mobile devices with respect to wireless communications services provided by a service provider. In implementations, a service provider system includes a mobile services back office system configured to perform an activation process for a mobile device, and a local services back office system including a correlation engine. The correlation engine is configured to compare a customer identifier for the mobile device based on an access point identifier to a customer identifier for the mobile device obtained from the mobile services back office system when the mobile device is connected to an access point associated with the access point identifier, compare characteristics of the mobile device obtained from the access point with characteristics of the mobile device maintained by the mobile services back office system when the customer identifier based on the access device identifier matches the customer identifier obtained from the mobile services back office system; identify the mobile device as a potential service provider provided mobile device in a fidelity matrix if the mobile device foregoes use of mobile services for data usage when the characteristics of the mobile device obtained from the access point substantially matches the characteristics of the mobile device maintained by the mobile services back office system and an average connection time with the access device exceeds or meets a threshold, and verify that the mobile device is a service provider provided mobile device when a fidelity score level in the fidelity matrix meets or exceeds a defined fidelity threshold, where the fidelity score level is based on data usage patterns for the mobility device when connected to the access device.

In implementations, the correlation engine is further configured to determine the average connection time for the mobile device with the access device across a defined period of time. In implementations, the correlation engine is further configured to establish the data usage patterns for the mobile device using machine learning techniques. In implementations, the local services back office system is configured to trigger the correlation engine when the mobile device is a mobile device with mobile services capability. In implementations, the local services back office system is further configured to determine the mobile services capability from mobile device information received from the access point. In implementations, the fidelity matrix includes multiple fidelity score levels and the correlation engine is further configured to proceed from one fidelity score level to a next fidelity score level when the data usage patterns for the mobility device at the one fidelity score level exceeds or meets a defined threshold.

Disclosed herein is a method for correlation and management of mobile devices with respect to wireless communications services provided by a service provider. In implementations, the method includes triggering a device correlation engine when a mobile device connected to an access device has mobile services capability, comparing, by the device correlation engine for the mobile device, an access device based customer identifier with a mobile services based customer identifier, comparing, by the device correlation engine for the mobile device, access device based characteristics with mobile services based characteristics when a match occurs between the access device based customer identifier and the mobile services based customer, marking in a fidelity matrix that the mobile device is a potential service provider provided mobile device if the mobile device foregoes use of mobile services for data usage when a match occurs between the access device based characteristics and the mobile services based characteristics and an average connection time with the access device exceeds or meets a threshold, and verifying that the mobile device is a service provider provided mobile device when a fidelity score level in the fidelity matrix meets or exceeds a defined fidelity threshold, wherein the fidelity score level is based on data usage patterns for the mobility device when connected to the access device.

In implementations, the method further includes determining the average connection time for the mobile device with the access device across a defined period of time. In implementations, the method further includes establishing the data usage patterns for the mobile device using machine learning techniques. In implementations, the method further includes determining the mobile services capability from mobile device information received from an access device. In implementations, the method further includes proceeding from one fidelity score level to a next fidelity score level when the data usage patterns for the mobility device at the one fidelity score level exceeds or meets a defined threshold. In implementations, the access device based customer identifier and the access device based characteristics are determined from information provided the access device. In implementations, the mobile services based customer identifier and the mobile services based characteristics are determined from information provided a mobile services back office system.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for correlation of mobile devices with respect to wireless communications services provided by a service provider, the method comprising:

determining, by a device correlation engine in a service provider system, that a customer identifier associated with an access device to which a mobile device is connected matches a customer identifier for the mobile device obtained from a mobile services back office system of a service provider, wherein the access device provides local services and is a service provider device;

determining, by the device correlation engine, that characteristics of the mobile device obtained by a local services back office system of the service provider matches characteristics of the mobile device maintained by the mobile services back office system when the customer identifier associated with the access device matches the customer identifier for the mobile device obtained from the mobile services back office system;

determining, by the device correlation engine, an average connection time for the mobile device with the access device across a defined period of time when the characteristics of the mobile device obtained by the local services back office system matches the characteristics of the mobile device maintained a by the mobile services back office system;

marking, by the device correlation engine, the mobile device as a potential service provider provided mobile device in a fidelity matrix when mobile device foregoes use of mobile services for data usage when the average connection time meets or exceeds a defined threshold;

confirming, by the device correlation engine, that the mobile device is a service provider provided mobile device when a fidelity score level in the fidelity matrix meets or exceeds a defined fidelity threshold, wherein the fidelity score level is based on data usage patterns for the mobility device when connected to the access device; and in response to the confirming, switching traffic of the service provider provided mobile device from mobile service to local service.

2. The method of claim 1, further comprising:

triggering, by the local services back office system the device correlation engine, when the mobile device is a mobile device with mobile services capability.

3. The method of claim 2, further comprising:

determining, by the local services back office system, whether the mobile device is a mobile device with mobile services capability.

4. The method of claim 2, further comprising:

receiving, by the local services back office system from the access device, mobile device information to determine the mobile services capability.

5. The method of claim 1, wherein the customer identifier associated with the access device is determined and maintained by the local services back office system.

6. The method of claim 1, further comprising:

determining, by the local services back office system, the customer identifier in the local services back office system based on an access device identifier received from the access device.

7. The method of claim 1, further comprising:

receiving, by the local services back office system from the access device, the characteristics of the mobile device as maintained by the local services back office system.

8. A service provider system, comprising:

a mobile services back office system configured to perform an activation process for a mobile device; and a local services back office system including a correlation engine, wherein the correlation engine is configured to:

compare a customer identifier for the mobile device based on an access point identifier to a customer identifier for the mobile device obtained from the mobile services back office system when the mobile device is connected to an access point associated with the access point identifier;

compare characteristics of the mobile device obtained from the access point with characteristics of the mobile device maintained by the mobile services back office system when the customer identifier based on the access device identifier matches the customer identifier obtained from the mobile services back office system;

identify the mobile device as a potential service provider provided mobile device in a fidelity matrix if the mobile device foregoes use of mobile services for data usage when the characteristics of the mobile device obtained from the access point substantially matches the characteristics of the mobile device maintained by the mobile services back office system and an average connection time with the access device exceeds or meets a threshold;

verify that the mobile device is a service provider provided mobile device when a fidelity score level in the fidelity matrix meets or exceeds a defined fidelity threshold, wherein the fidelity score level is based on data usage patterns for the mobility device when connected to the access device; and in response to the verify step, switch traffic of the service provider provided mobile device from mobile service to local service.

9. The system of claim 8, wherein the correlation engine is further configured to:

determine the average connection time for the mobile device with the access device across a defined period of time.

10. The system of claim 8, wherein the correlation engine is further configured to:

establish the data usage patterns for the mobile device using machine learning techniques.

11. The system of claim 8, wherein the local services back office system is configured to:

trigger the correlation engine when the mobile device is a mobile device with mobile services capability.

12. The system of claim 11, wherein the local services back office system is further configured to:

determine the mobile services capability from mobile device information received from the access point.

13. The system of claim 8, wherein the fidelity matrix includes multiple fidelity score levels and the correlation engine is further configured to:

proceed from one fidelity score level to a next fidelity score level when the data usage patterns for the mobility device at the one fidelity score level exceeds or meets a defined threshold.

14. A method, comprising:

triggering a device correlation engine when a mobile device connected to an access device has mobile services capability;

determining, by the device correlation engine for the mobile device, a match between an access device based customer identifier and a mobile services based customer identifier;

comparing, by the device correlation engine for the mobile device, access device based characteristics with mobile services based characteristics in response to the determining of the match between the access device based customer identifier and the mobile services based customer;

marking in a fidelity matrix that the mobile device is a potential service provider provided mobile device when the mobile device foregoes use of mobile services for data usage when a match occurs between the access device based characteristics and the mobile services based characteristics and an average connection time with the access device exceeds or meets a threshold;

verifying that the mobile device is a service provider provided mobile device when a fidelity score level in the fidelity matrix meets or exceeds a defined fidelity threshold, wherein the fidelity score level is based on data usage patterns for the mobility device when connected to the access device; and in response to the verifying, switching traffic of the service provider provided mobile device from mobile service to local service.

15. The method of claim 14, further comprising:

determining the average connection time for the mobile device with the access device across a defined period of time.

16. The method of claim 14, further comprising:

establishing the data usage patterns for the mobile device using machine learning techniques.

17. The method of claim 14, further comprising:

determining the mobile services capability from mobile device information received from an access device.

18. The method of claim 14, further comprising:

proceeding from one fidelity score level to a next fidelity score level when the data usage patterns for the mobility device at the one fidelity score level exceeds or meets a defined threshold.

19. The method of claim 14, wherein the access device based customer identifier and the access device based characteristics are determined from information provided the access device.

20. The method of claim 19, wherein the mobile services based customer identifier and the mobile services based characteristics are determined from information provided a mobile services back office system.

* * * * *